D. M. McLAUGHLIN.
HEATING SYSTEM.
APPLICATION FILED MAR. 19, 1910.
1,010,293.
Patented Nov. 28, 1911.
2 SHEETS—SHEET 1.
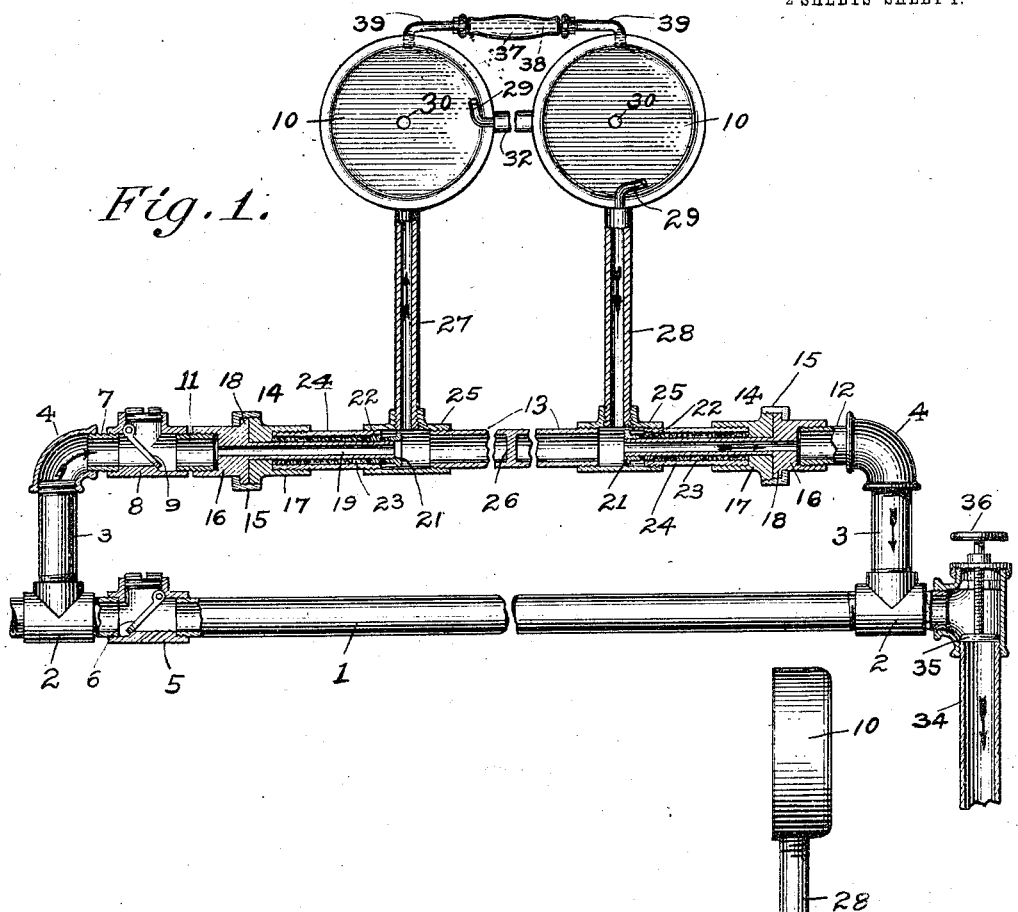
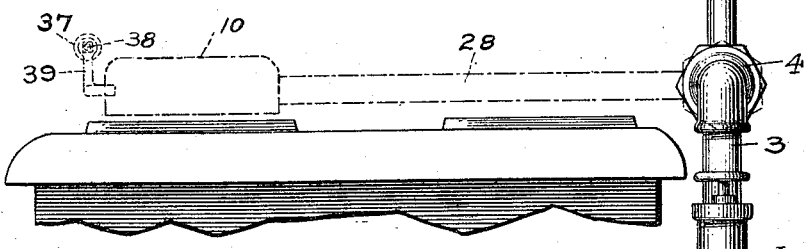
Witnesses:
Inventor,

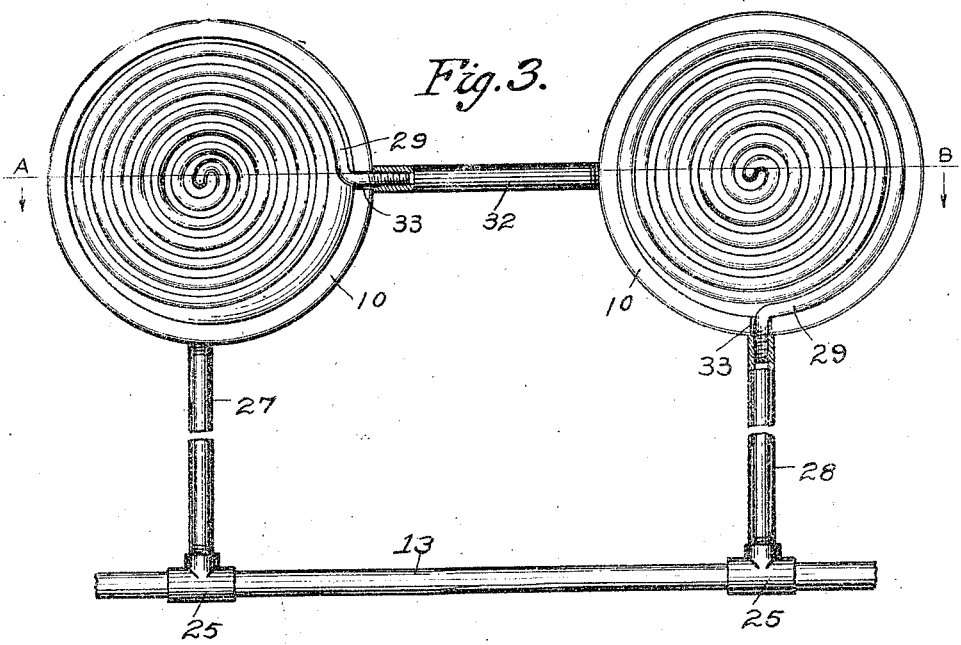

UNITED STATES PATENT OFFICE.

DANIEL M. McLAUGHLIN, OF LOUISVILLE, KENTUCKY.

HEATING SYSTEM.

1,010,293.  Specification of Letters Patent.  Patented Nov. 28, 1911.

Application filed March 19, 1910. Serial No. 550,337.

*To all whom it may concern:*

Be it known that I, DANIEL M. McLAUGHLIN, a citizen of the United States, residing at Louisville, in the county of Jefferson and State of Kentucky, have invented certain new and useful Improvements in Heating Systems; and I do hereby declare the following to be a full, clear, and exact description of the invention, such as will enable others skilled in the art to which it appertains to make and use the same.

This invention relates to improvements in heating systems, and has for an object to provide a system of pipes, in combination with a heater, the pipes having valves for automatically opening against the pressure of the water therein, when a portion of the water has been heated to produce a higher pressure against one side of the valves, than exists upon the other side.

A further object of the invention is to provide in a heating system, a heater adapted to be connected with a flame for heating water passing through said system and said heater.

A further object of the invention is to provide in a heating system, a heater adapted to be moved into and out of engagement with a flame burning adjacent the heater.

A further object of the invention is to provide in a heating system, in combination with a device for transmitting heat, a heater for heating water passing through said system and said heater.

A further object of the invention is to provide in a heating system, a heater pivotally mounted, to be operated into and out of contact with a flame for heating water passing through said heater.

A further object of the invention is to provide in a heating system, in combination with a heater, means for operating the heater into and out of contact with a heating medium.

A further object of the invention is to provide in a heating system, a heater adjustably mounted for the purpose of varying the position of the heater, to permit the same to be heated by a device for transmitting heat thereto.

A further object of the invention is to provide in a heating system, in combination with a heater, a flexible water-tight joint, through which water may be conveyed to the heater.

A further object of the invention is to provide in a heating system, in combination with a heater, a rotatable water-tight joint to prevent the leaking of water passing through the joint to or from the heater.

A further object of the invention is to provide in a heating system, in combination with individual heaters, coil pipes connected with the heaters to receive and transmit water from one heater to the other, the coils being so arranged as to be simultaneously heated with the heaters, for increasing the heat of the water passing therethrough.

A further object of the invention is to provide in a heating system, in combination with a heater, a frictional water-tight rotatable joint, between said system and said heater, whereby the friction between parts of said joint acts to retard the movement of said heater from a vertical to a horizontal position, sufficiently to prevent the heaters from falling by the action of gravitation.

With these and other objects in view, the invention comprises certain other novel constructions, combinations and arrangements of parts, as will be hereinafter fully described and claimed.

In the drawings, Figure 1 represents a vertical fragmentary sectional view through the heaters, the heater pipes and the joints and valves located therein, with the heaters in a raised position. Fig. 2 represents a side elevation of the heater in a raised position, and showing, by dotted lines, the horizontal position of the heater in connection with the top of a range. Fig. 3 represents an enlarged bottom plan view of the heaters, showing the manner of attaching the coils thereto and connecting the heaters together. Fig. 4 is a section through the heaters, taken on lines A—B of Fig. 3. Fig. 5 is an enlarged detailed sectional view of the rotatable water-tight joint shown in duplicate in Fig. 1.

This invention is intended to be applicable to stoves, gas ranges, electric heaters or any fuel burning device, for heating water for household or other purposes. The device as shown, is placed behind a gas range, out of the way when not in use, and by means of the rotatable water-tight joint it may be brought into position, as shown by dotted lines in Fig. 2, to be heated by a flame from the range.

Referring to the drawings by numerals, 1 represents a water pipe adapted to be connected with a water main. Mounted upon the pipe 1 is a pair of T's, as at 2, which are connected with short upright pipes 3, which in turn are connected with a pair of L's, as at 4. Mounted on the pipe 1 between the T's 2 is a valve casing 5, in which is situated a flap valve 6, positioned to force water through the first upright pipe 3 and thence through the heaters to the faucet. A short connecting pipe 7 is secured to the left hand member 4, which connects with one end of a valve casing 8, in which is seated a flap valve 9, positioned to allow water to pass to the heaters 10, but to prevent its returning therefrom. The other end of the valve casing 8 is connected with a short pipe 11, and a corresponding short pipe 12 is connected to the right hand member 4. Between the pipes 11 and 12 the parts of the mechanism are duplicated on each side of the centrally closed pipe 13, and a description of one set of the parts will be sufficient for both, the same numerals applying to each. Connected to the pipes 11 and 12 are a pair of water-tight rotatable joints 14. The rotatable water-tight joints 14 consist of a union-nut 15 securing a rigid joint-connection 16 in frictional engagement with a rotatable reducing-connection 17. The union-nut 15 is made rigid with the reducing-connection 17 by being screwed upon same, but is left free to turn upon the rigid connection 16, in frictional engagement therewith. The nut 15 is held upon the rigid connection 16 by means of a flange 18 carried by the connection, which engages the inner flange of the nut. The rigid connection 16 is provided with a hollow stem 19, which is threaded externally on its outer end. An open packing nut 21, threaded internally to receive the end of the hollow stem 19, is adapted to adjustably engage and position a packing ring 22, bearing against packing 23 positioned around the hollow stem 19 and contained in a hollow pipe 24, connecting the T 25 with the reducing-connection 17. The pipe 24 is screwed into one end of the T 25, in which is positioned the end of the stem 19 and the packing nut 21 located thereon. A ground joint is formed between the packing nut 21 and the packing ring 22 to prevent the back passage of water between the ring and the nut. In the opposite end of the T 25, is screwed the central pipe 13, with a partition 26 located therein, to force water from the hollow stem 19 up through the pipe 27, connecting the T 25 and one of the heaters 10. The pipe 27 is threaded externally at both ends to screw into the heater and the T, while a similar pipe 28 is threaded externally at the bottom end to screw into the other T 25, and internally at the top end to receive an externally threaded coil pipe 29.

The coil pipe 29 is made the same in both heaters and is screwed into an opening 30 in the bottom wall of the heater near the center thereof and coiled so as to allow a suitable space between each coil and in such a manner as to allow the flame from the burner to play at a right angle to the bottom of the heater and simultaneously at the same angle upon the coil. The coils 29 are also spaced a short distance from the bottom of the heater, to furnish an air chamber for the better combustion of the gases around the heating surfaces of the coils and heaters.

Any back radiation of heat from the bottom walls of the heaters will strike the coils and tend to increase the heat of the water passing therethrough. The heaters are provided with water heating chambers 31, with which are connected the coil pipes 29. The two heaters are connected by a cross pipe 32, one end of which is threaded externally, to screw into one of the heaters and the other threaded internally to receive the outer externally threaded end of the coil from the opposite heater. The pipe 32 serves as a brace and tie between the two heaters, as well as a means for conveying water from one of the heaters to the other. A concave opening 33 is cut in the bottom circular wall of the heaters to receive the coil pipes 29, the openings being smaller in diameter than the outside diameter of the connecting pipes 28 and 32, to provide a shoulder or seat for the ends of the two connecting pipes, which bear against the outer peripheries of the walls of the heaters. A discharge pipe 34 is provided, having a valve 35 located therein, which is operated by a handle 36 for discharging hot or cold water from and through the heaters, as desired.

In order to provide means for moving the heaters into and out of engagement with the burners of the gas range, a handle 37, (shown only in Figs. 1 and 2) of some non-heat-conducting material, is mounted on a bolt or shaft 38, passing through an upturned eye, carried by each of the handle supports 39, with opposite ends turned at right angles to the main body of the support and screwed into the walls of the heaters, for the purpose of supporting the handle.

In my improved device, when it is desired to heat a quantity of water, the heaters are lowered by the rotation of the movable parts of the water-tight joint upon the rigid parts thereof, to a position immediately over the burners of the gas range and the burners then being lighted, or previously having been lighted, permit the flames to come in direct contact with the heaters and the coils, positioned thereunder, and by opening the valve 35, hot water will begin to flow from the discharge pipe 34 and will continue to do so, as long as the gas remains burning in contact with the heaters.

The object of the flap valve 6 is to act, in part, as a safety valve, so that in case the valve 35 is left closed and the pressure of the water in the heaters, by reason of being heated, becomes greater than the initial pressure of the water in the pipe leading to the heaters, the danger of an explosion may be avoided, by the flowing of the heated water, or steam, through the pipe 1 to the back face of the flap valve 6, to raise the valve and allow the pressure to equalize on both sides thereof. Likewise the flap valve 9 being set in the opposite direction to the valve 6, will prevent cold water from passing back into the entrance pipes leading from the main. But as long as valve 35 is open and water is being heated, the initial pressure of the cold water in the entrance pipes will raise the valve 9 and allow the water to flow through the heaters to the discharge pipe 34. However the valve 35 does not have to be opened in order for the cold water in the pipes leading to the heater to flow through the heaters, as the pressure of the water in the pipes will raise the valve 9, regardless of whether the valve 35 is open or not.

If valve 35 is closed the water will circulate through by-pass 1, and from thence back to the heaters, through the cool water supply side of said heaters. This circulation of water is caused by the displacement of the heated water in the heaters 10—10 and it is caused to move in this direction by the position of the valve members 6 and 9 which do not materially resist such circulation, but will prevent any reverse circulation.

While the device herein described is shown in connection with a gas range, it will be obvious that it could equally as well be applied to other heating mediums.

What I claim is—

1. In a heating system, a heater, a cold water pipe leading to the heater, a check valve positioned in the pipe and adapted to permit the flow of water to the heater, a hot water pipe leading from the heater, a valve interposed in the hot water pipe, a by-pass pipe connecting the hot water pipe with the cold water pipe for short circuiting the water from the hot water pipe to the cold water pipe when the valve in the hot water pipe is closed, a check valve positioned in the by-pass pipe and adapted to permit hot water to flow into the cold water pipe, and means for pivotally connecting the heater with the hot and cold water pipes whereby the heater may be moved into and out of engagement with a fixed heating medium.

2. In a heating system, a heater, a cold water pipe leading to the heater, a check valve positioned in the pipe and adapted to permit the flow of water toward the heater, a hot water pipe leading from the heater, a valve interposed in the hot water pipe, a by-pass pipe connecting the hot water pipe with the cold water pipe for short circuiting the water from the hot water pipe to the cold water pipe when the valve in the hot water pipe is closed, a check valve positioned in the by-pass pipe and adapted to permit hot water to flow into the cold water pipe, and a rotatable frictional joint connecting the heater to the hot and cold water pipes whereby the friction of the joint serves to retard the movement of the heater from a substantially vertical position downward.

3. In a heating system, a heater, an entrance pipe to the heater, a discharge pipe from the heater, means for pivotally connecting the heater with the pipes, a water heating chamber carried by the heater, a coil pipe connected with the chamber and spaced from and adjacent the heater and connected with a discharge pipe, whereby water passing through the heater and the coil pipe may be heated simultaneously and discharged from the heater, and means for automatically equalizing the pressure of the hot water from the heater with the water in the cold water pipes.

4. In a heating system, a heater, an entrance pipe to the heater, a discharge pipe from the heater, means for pivotally connecting the heater with the pipes, a water heating chamber carried by the heater, a coil pipe connected with the chamber and spaced from and adjacent the heater and connected with the discharge pipe, whereby water passing through the heater and the coil pipe may be heated simultaneously and discharged from the heater.

In testimony whereof I affix my signature in presence of two witnesses.

DANIEL M. McLAUGHLIN.

Witnesses:
  H. MENEBOOKER,
  W. W. STOUFFER.